(12) United States Patent
Killilea et al.

(10) Patent No.: US 8,133,588 B2
(45) Date of Patent: *Mar. 13, 2012

(54) COATING SYSTEM FOR CEMENT COMPOSITE ARTICLES

(75) Inventors: T Howard Killilea, North Oaks, MN (US); Kevin W. Evanson, Maple Grove, MN (US); Wylie H Wetzel, Woodbury, MN (US); Archie W. Garner, Ham Lake, MN (US); Glen Otto Vetter, New Hope, MN (US); John W Mittelsteadt, Lakeville, MN (US); Stephen M. Carlson, Burnsville, MN (US); Larry B. Brandenburger, Circle Pines, MN (US)

(73) Assignee: Valspar Sourcing, Inc., Minneapolis, MN (US)

( * ) Notice: Subject to any disclaimer, the term of this patent is extended or adjusted under 35 U.S.C. 154(b) by 762 days.

This patent is subject to a terminal disclaimer.

(21) Appl. No.: 11/751,459

(22) Filed: May 21, 2007

(65) Prior Publication Data

US 2007/0269660 A1 Nov. 22, 2007

Related U.S. Application Data

(60) Provisional application No. 60/802,186, filed on May 19, 2006, provisional application No. 60/898,620, filed on Jan. 30, 2007.

(51) Int. Cl.
*B32B 27/38* (2006.01)
*B32B 27/12* (2006.01)
*B32B 27/18* (2006.01)
*B05D 1/36* (2006.01)
*B05D 1/38* (2006.01)
*B05D 3/02* (2006.01)

(52) U.S. Cl. ........ 428/414; 428/413; 428/500; 427/386; 427/407.1

(58) Field of Classification Search .................. None
See application file for complete search history.

(56) References Cited

U.S. PATENT DOCUMENTS

| | | | |
|---|---|---|---|
| 2,128,961 A | 9/1938 | Patterson | |
| 2,356,542 A | 8/1944 | Sloan | |
| 2,633,458 A | 3/1953 | Shokal | |
| 2,674,775 A | 4/1954 | Willson | |
| 2,727,012 A | 12/1955 | Treat et al. | |
| 2,730,517 A | 1/1956 | Vogel et al. | |
| 3,010,919 A | 11/1961 | MacKinney et al. | |
| 3,049,458 A | 8/1962 | Willard | |
| 3,091,551 A | 5/1963 | Robertson | |
| 3,219,467 A | 11/1965 | Redican et al. | |
| 3,380,831 A | 4/1968 | Cohen et al. | |
| 3,449,161 A | 6/1969 | Hindersinn et al. | |
| 3,655,423 A | 4/1972 | Lin et al. | |
| 3,781,396 A | 12/1973 | Okuda et al. | |
| 3,899,611 A | 8/1975 | Hall | |
| 3,935,173 A | 1/1976 | Ogasawara et al. | |
| 3,935,364 A | 1/1976 | Prokesh et al. | |
| 3,970,628 A | 7/1976 | Connelly et al. | |
| 4,015,040 A | 3/1977 | Hoshida et al. | |
| 4,028,294 A | 6/1977 | Brown et al. | |
| 4,113,893 A | 9/1978 | Hahn | |
| 4,132,526 A | 1/1979 | Schwarz et al. | |
| 4,197,389 A * | 4/1980 | Becker et al. | 523/420 |
| 4,211,848 A | 7/1980 | Blount | |
| 4,228,761 A | 10/1980 | Glover et al. | |
| 4,333,867 A | 6/1982 | Sauntson | |
| 4,385,152 A | 5/1983 | Boyack et al. | |
| 4,390,688 A | 6/1983 | Walz et al. | |
| 4,408,018 A | 10/1983 | Bartman et al. | |
| 4,486,553 A * | 12/1984 | Wesch | 523/179 |
| 4,522,962 A | 6/1985 | Abbey et al. | |
| 4,536,534 A | 8/1985 | Singer et al. | |
| 4,582,755 A | 4/1986 | Dietrich | |
| 4,598,108 A * | 7/1986 | Hoefs | 523/411 |
| 4,719,149 A | 1/1988 | Aasen et al. | |
| 4,742,121 A | 5/1988 | Toman | |
| 4,852,316 A | 8/1989 | Webb | |
| 4,880,660 A | 11/1989 | Aasen et al. | |
| 4,886,852 A | 12/1989 | Numa | |
| 4,904,522 A | 2/1990 | Markusch | |
| 4,908,229 A | 3/1990 | Kissel | |
| 4,916,004 A | 4/1990 | Ensminger et al. | |
| 5,017,632 A | 5/1991 | Bredow et al. | |
| 5,073,578 A | 12/1991 | Boodaghains et al. | |
| 5,075,370 A | 12/1991 | Kubitza et al. | |
| 5,100,948 A | 3/1992 | Aydin et al. | |
| 5,157,074 A | 10/1992 | Metzger et al. | |

(Continued)

FOREIGN PATENT DOCUMENTS

AU 198060655 A1 3/1981

(Continued)

OTHER PUBLICATIONS

Technical Data for Ancarez AR550 Waterborne Epoxy Resin, provided by Air Products (no date).*
Technical Data for Anquamine 401 Curing Agent, provided by Air Products (no date).*
Technical Data for Polycat 41 Catalyst, provided by Air Products (no date).*
ASTM D6944-03, Test Method A (2003).
Koleske et al., *Two Thousand Three Additives Guide*, Paint and Coatings Industry, pp. 12-86, (Apr. 2003).
Witzeman, J. S. et al., *Comparison of Methods for the Preparation of Acetoacetylated Coating Resins*, Coatings Technology; vol. 62, No. 789, pp. 101-112 (Oct. 1990).
American Society of Testing Materials, ASTM Designation: D523-89, "Standard Test Method for Specular Gloss;" 5 pages, (Reapproved 1999).
American Society of Testing Materials, ASTM Designation: D5402-93, "Standard Practice for Assessing the Solvent Resistance of Organic Coatings Using Solvent Rubs;" 3 pages, (Reapproved 1999).
Eastman Chemical Company, Publications N-319C, Kingport, TN., Title Page, Table of Contents, "Acetoacetoxyethyl Methacrylate (AAEM) Acetoacetyl Chemistry," pp. 1-11, (Dec. 1999).

(Continued)

*Primary Examiner* — Michael J Feely

(74) *Attorney, Agent, or Firm* — IPLM Group, P.A.

(57) ABSTRACT

A coated article and method of employing a water-based coating composition on a fiber cement composite substrate is provided. The coating composition contains: an epoxy resin, a crosslinker having epoxide-reactive functional groups, a latex polymer distinct from the epoxy resin, and water.

36 Claims, 1 Drawing Sheet

U.S. PATENT DOCUMENTS

| | | |
|---|---|---|
| 5,191,012 A | 3/1993 | Markusch et al. |
| 5,212,230 A | 5/1993 | Tirpak et al. |
| 5,221,710 A | 6/1993 | Markusch et al. |
| 5,236,994 A | 8/1993 | Markusch et al. |
| 5,296,530 A | 3/1994 | Bors et al. |
| 5,356,716 A | 10/1994 | Patel |
| 5,407,783 A | 4/1995 | Caruso |
| 5,409,984 A | 4/1995 | Gerhardinger |
| 5,418,264 A * | 5/1995 | Obloh et al. .................. 523/414 |
| 5,426,142 A | 6/1995 | Rosano et al. |
| 5,461,125 A | 10/1995 | Lu et al. |
| 5,468,804 A | 11/1995 | Schmalstieg et al. |
| 5,478,601 A | 12/1995 | Larson et al. |
| 5,484,849 A | 1/1996 | Bors et al. |
| 5,500,457 A | 3/1996 | Sarkar et al. |
| 5,534,310 A | 7/1996 | Rokowski et al. |
| 5,559,192 A | 9/1996 | Bors et al. |
| 5,562,953 A | 10/1996 | Bors et al. |
| 5,567,767 A | 10/1996 | Smeal et al. |
| 5,571,863 A | 11/1996 | Smeal et al. |
| 5,672,379 A | 9/1997 | Schall et al. |
| 5,681,385 A | 10/1997 | Beckenhauer |
| 5,688,867 A | 11/1997 | Scheibelhoffer et al. |
| 5,708,077 A | 1/1998 | Nölken et al. |
| 5,708,093 A | 1/1998 | Bastelberger et al. |
| 5,718,943 A | 2/1998 | Hsu et al. |
| 5,766,768 A * | 6/1998 | Cummings et al. ........... 428/418 |
| 5,777,053 A | 7/1998 | McBain et al. |
| 5,798,426 A | 8/1998 | Anton et al. |
| 5,814,397 A | 9/1998 | Cagliostro et al. |
| 5,869,590 A | 2/1999 | Clark et al. |
| 5,874,503 A | 2/1999 | Scheibelhoffer et al. |
| 5,928,778 A | 7/1999 | Takahashi et al. |
| 5,945,044 A | 8/1999 | Kawai et al. |
| 5,962,571 A | 10/1999 | Overbeck et al. |
| 5,973,068 A | 10/1999 | Yamaya et al. |
| 5,994,428 A | 11/1999 | Lutz et al. |
| 5,997,952 A | 12/1999 | Harris et al. |
| 6,007,619 A | 12/1999 | Laas et al. |
| 6,008,289 A | 12/1999 | König et al. |
| 6,030,447 A | 2/2000 | Naji et al. |
| 6,045,871 A | 4/2000 | Matt et al. |
| 6,045,873 A | 4/2000 | Adachi et al. |
| 6,048,471 A | 4/2000 | Henry |
| 6,063,864 A | 5/2000 | Mathur et al. |
| 6,103,352 A | 8/2000 | Takahashi |
| 6,114,440 A | 9/2000 | Yamaya et al. |
| 6,136,383 A | 10/2000 | Schwartz et al. |
| 6,146,710 A | 11/2000 | Symons |
| 6,162,511 A | 12/2000 | Garnett et al. |
| 6,235,228 B1 | 5/2001 | Nicholl et al. |
| 6,297,320 B1 | 10/2001 | Tang et al. |
| 6,346,146 B1 | 2/2002 | Duselis et al. |
| 6,395,827 B1 | 5/2002 | Pears et al. |
| 6,426,414 B1 | 7/2002 | Laas et al. |
| 6,458,250 B1 | 10/2002 | Holliday et al. |
| 6,475,556 B1 * | 11/2002 | Sobczak et al. ............... 427/137 |
| 6,485,601 B1 | 11/2002 | Egan et al. |
| 6,485,793 B1 | 11/2002 | Ott et al. |
| 6,492,450 B1 | 12/2002 | Hsu |
| 6,506,248 B1 | 1/2003 | Duselis et al. |
| 6,534,176 B2 | 3/2003 | Terase et al. |
| 6,555,625 B1 | 4/2003 | Overbeek et al. |
| 6,590,025 B1 | 7/2003 | Carlson et al. |
| 6,635,735 B1 | 10/2003 | Zhang et al. |
| 6,638,567 B1 | 10/2003 | Beisele |
| 6,641,629 B2 | 11/2003 | Safta et al. |
| 6,649,679 B1 | 11/2003 | Stockl et al. |
| 6,660,386 B2 | 12/2003 | Haque |
| 6,696,518 B1 | 2/2004 | Dersch et al. |
| 6,740,423 B2 | 5/2004 | Murase |
| 6,753,394 B2 | 6/2004 | Weikard et al. |
| 6,762,230 B2 | 7/2004 | Brandenburger et al. |
| 6,818,697 B2 | 11/2004 | Zhang et al. |
| 6,849,338 B2 | 2/2005 | Clemens et al. |
| 6,893,751 B2 | 5/2005 | Naji et al. |
| 6,941,720 B2 | 9/2005 | DeFord et al. |
| 6,998,012 B2 | 2/2006 | Koelliker et al. |
| 7,049,352 B2 | 5/2006 | Gould et al. |
| 7,101,921 B2 | 9/2006 | Edwards et al. |
| 7,105,593 B2 | 9/2006 | Solomon et al. |
| 7,148,270 B2 | 12/2006 | Bowe |
| 7,235,595 B2 | 6/2007 | Hermes et al. |
| 7,235,603 B2 | 6/2007 | Madle et al. |
| 7,238,391 B2 | 7/2007 | Dargontina et al. |
| 7,247,671 B2 | 7/2007 | Overbeek et al. |
| 7,265,166 B2 | 9/2007 | Gebhard et al. |
| 7,338,989 B2 * | 3/2008 | Gross et al. .................. 523/404 |
| 7,381,785 B2 | 6/2008 | Detrembleur et al. |
| 7,449,516 B2 | 11/2008 | Bayer et al. |
| 7,758,954 B2 | 7/2010 | Nguyen et al. |
| 2002/0009622 A1 | 1/2002 | Goodson |
| 2002/0179240 A1 | 12/2002 | Clemens et al. |
| 2002/0195191 A1 | 12/2002 | Weiss et al. |
| 2003/0055171 A1 | 3/2003 | Overbeek et al. |
| 2003/0073778 A1 | 4/2003 | Zhang et al. |
| 2003/0089061 A1 | 5/2003 | DeFord et al. |
| 2003/0150359 A1 | 8/2003 | Lassmann |
| 2003/0153673 A1 | 8/2003 | Schwalm et al. |
| 2003/0203991 A1 | 10/2003 | Schottman et al. |
| 2003/0207121 A1 | 11/2003 | McGee |
| 2003/0224184 A1 | 12/2003 | Hermes et al. |
| 2004/0002559 A1 | 1/2004 | Troutman et al. |
| 2004/0044094 A1 | 3/2004 | Garnett |
| 2004/0082715 A1 | 4/2004 | Bayer et al. |
| 2004/0086676 A1 | 5/2004 | Peng |
| 2004/0161542 A1 | 8/2004 | Ziemann et al. |
| 2004/0176502 A1 | 9/2004 | Raymond et al. |
| 2004/0198903 A1 | 10/2004 | Madle et al. |
| 2004/0229978 A1 | 11/2004 | Bowe |
| 2005/0027079 A1 | 2/2005 | Palmer Lauer et al. |
| 2005/0053797 A1 | 3/2005 | Rumph et al. |
| 2005/0176321 A1 | 8/2005 | Crette et al. |
| 2005/0203211 A1 | 9/2005 | Gebhard |
| 2005/0208285 A1 | 9/2005 | Lyons et al. |
| 2006/0013950 A1 | 1/2006 | Porter et al. |
| 2006/0024480 A1 | 2/2006 | Lyons et al. |
| 2006/0046068 A1 | 3/2006 | Barancyk et al. |
| 2006/0048708 A1 | 3/2006 | Hartig |
| 2006/0111503 A1 * | 5/2006 | Killilea et al. ................. 524/501 |
| 2006/0135684 A1 | 6/2006 | Killilea |
| 2006/0135686 A1 | 6/2006 | Kililea et al. |
| 2006/0182946 A1 | 8/2006 | Zarb et al. |
| 2006/0288909 A1 | 12/2006 | Naji et al. |
| 2007/0042192 A1 * | 2/2007 | Nguyen et al. ................ 428/420 |
| 2007/0110981 A1 | 5/2007 | Killilea et al. |
| 2007/0149077 A1 | 6/2007 | Stanislawczyk et al. |
| 2007/0213445 A1 | 9/2007 | Klijn et al. |
| 2007/0259166 A1 | 11/2007 | Killilea et al. |
| 2007/0259188 A1 | 11/2007 | Wu et al. |
| 2007/0269660 A1 | 11/2007 | Killilea et al. |
| 2007/0282046 A1 | 12/2007 | Killilea et al. |
| 2008/0008895 A1 * | 1/2008 | Garner et al. ................. 428/500 |
| 2008/0139737 A1 | 6/2008 | Alderfer et al. |
| 2008/0141908 A1 | 6/2008 | Peng et al. |

FOREIGN PATENT DOCUMENTS

| | | |
|---|---|---|
| AU | 2005100347 B4 | 5/2005 |
| DE | 33 02 767 A1 | 8/1984 |
| EP | 0 060 505 A1 | 9/1982 |
| EP | 0 486 278 A1 | 5/1992 |
| EP | 0 623 659 A2 | 11/1994 |
| EP | 0 697 417 A1 | 2/1996 |
| EP | 0 705 855 A2 | 4/1996 |
| EP | 0 728 779 B2 | 8/1996 |
| EP | 0 894 780 A1 | 2/1999 |
| EP | 1 454 935 A1 | 9/2004 |
| EP | 1 473 331 A1 | 11/2004 |
| EP | 1 589 083 A2 | 10/2005 |
| EP | 1 650 045 A2 | 4/2006 |
| EP | 1 798 258 A1 | 6/2007 |
| GB | 1 407 827 | 9/1975 |
| JP | 2005 307161 | 4/2005 |
| SU | 833892 | 5/1981 |
| WO | WO 94/07674 A1 | 4/1994 |
| WO | WO 98/45222 | 10/1998 |
| WO | WO 99/67312 | 12/1999 |

| WO | WO 00/23495 A1 | 4/2000 |
| WO | WO 00/56826 | 9/2000 |
| WO | WO 01/68547 A1 | 9/2001 |
| WO | WO 02/070623 A2 | 9/2002 |
| WO | WO 03/000761 A1 | 1/2003 |
| WO | WO 03/076536 A1 | 9/2003 |
| WO | WO 03/101918 A2 | 12/2003 |
| WO | WO 2005/071179 A1 | 8/2005 |
| WO | WO 2006/032512 A | 3/2006 |
| WO | WO 2006/065914 A1 | 6/2006 |
| WO | WO 2007/059516 A1 | 5/2007 |
| WO | WO 2007/087458 A1 | 8/2007 |
| WO | WO/2007/089807 A2 | 8/2007 |
| WO | WO 2007/089913 A1 | 8/2007 |
| WO | WO 2007/090132 A1 | 8/2007 |
| WO | WO 2008/018910 A2 | 2/2008 |

OTHER PUBLICATIONS

Lewis et al., "Luminescence", Hawley's Condensed Chemical Dictionary, 14th Ed., John Wiley and Sons, Inc., retrieved from Knovel® online; 1 page (2002).

"Photoinitiators for UV Curing," "Darocur 1173", p. 2; Ciba Specialty Chemicals; 8 pages (2003).

U.S. Federal Register, vol. 60, No. 116, pp. 31633-31637, (Jun. 16, 1995).

Wicks, Zeno W. Jr., et al., "Latexes", Organic Coatings, Science and Technology, Second Edition, (Wiley-Interscience, New York), Title Page, Copyright Page, Chapter 8, p. 143, (1999).

Dow® Z-6018 Intermediate Product Information, "Silicone Intermediates", 3 pgs., (Aug. 28, 2006).

ISR and Written Opinion for PCTUS/2007/069387 dated Oct. 15, 2007.

Clemens, R. J. et al., *A Comparison of Catalysts for Crosslinking Acetoacetylated Resins via the Michael Reaction*, Journal of Coatings Technology, Mar. 1989, vol. 61, No. 770, pp. 83-91.

Clemens, R. J., *A Comparison of Catalysts for Crosslinking Acetoacetylated Resins via the Michael Reaction*, Water-Borne & Higher Solids Coatings Symposium, 1988, New Orleans, LA, 55-67.

Wicks, Z.W. et al., *Epoxy and Phenolic Resins*, Organic Coatings Science and Technology, vol. 1, Chapter XI, pp. 162-187.

Tennebroek et al., *New Polymer Synthesis for (self) Crosslinkable Urethanes and Urethane Acrylics*, 4th Nürnberg Congress; International Centre for Coatings Technology, Paper 17, 2000, 19 pages.

Geurts, J.M. et al., *Self-crosslinkable Urethanes and Urethane/Acrylics*, Verfkroniek Nummer, Jan. 1999.

Geon® Lo-Sope Dispersion Resin, Geon® 171 Vinyl Chloride Homopolymer Technical Data Sheet, PolyOne Corporation, May 2003, 2 pages.

Geon Copolymer Dispersion Resin Geon® 137 Vinyl Chloride Copolymer Technical Data Sheet, PolyOne Corporation, Apr. 1997, 2 pages.

Industrial Research Services, *Test Report No. 54703-1 for Epirez Safe Step 100*, CSIRO, Manuf. & Infrastr. Technology, Australia, May 2004, pp. 1-6.

DSM NeoResins, Technical Data Sheet, DSM NeoResins Inc.,Bulletin XK-90, Jan. 2006, 6 pages.

Tex•Cote® Stretch Product Information, Textured Coatings of America, Inc., Panama City, Florida, Nov. 2003, 3 pages.

UCAR Emulsion Systems Applications, *Architectural Coatings-Exterior-Cement Fiber Board*, Dow Chemical Company product information sheet printed on Oct. 25, 2007 from the following internet archives website at: http://web.archive.org/web/20041022123748/http://www.dow.com/ucarlatex/app/arch/ex_fiber.htm.

Rector, F.D. et al., *Applicatons for the Acetoacetyl Chemistry in Thermoset Coatings*, Journal of Coatings Technology, vol. 61, No. 771, Apr. 1989.

"UV Cured Undercoat Vitrecure 7", Product Data Sheet 74, Architectural & Industrial Coatings, 1 page (Dec. 21, 2004).

"UV Cured Sealer for Cement Based Substrates Vitrecure 9", Product Data Sheet 54, Architectural & Industrial Coatings, 1 page (Jul. 24, 2004).

Fox, T. G., "Influence of diluent and of copolymer composition on the glass temperature of a polymer system", Bull. Am. Phys. Soc. I (3), 123 (1956).

PQ® Potassium Silicates, PQ Corporation Brochure, (2004).

Hardiplank™ Lap Siding Installation, James Hardie Siding Products, 8 pages, (Dec. 2005), http://www.jameshardie.com/homeowner/technical/installation/hardieplank_installation.php, downloaded from the Dec. 15, 2005 Internet Archive entry at: http://web.archive.org/web/20051215084041/http://www.jameshardie.com/homeowner/installation/hardiplank_installation.php.

"Siding Painting Tips", Paint Manufacturers' Recommendation Sheet—No. S-100, James Hardie Siding Products, 10 pages, (May 2005), http://www.jameshardie.com/homeowner/technical/paintingtips.php, downloaded from the Dec. 14, 2005 Internet Archive entry at: http://web.archive.org/web/20051214022056/http://www.jameshardie.com/homeowner/technical/paintingtips.php.

* cited by examiner

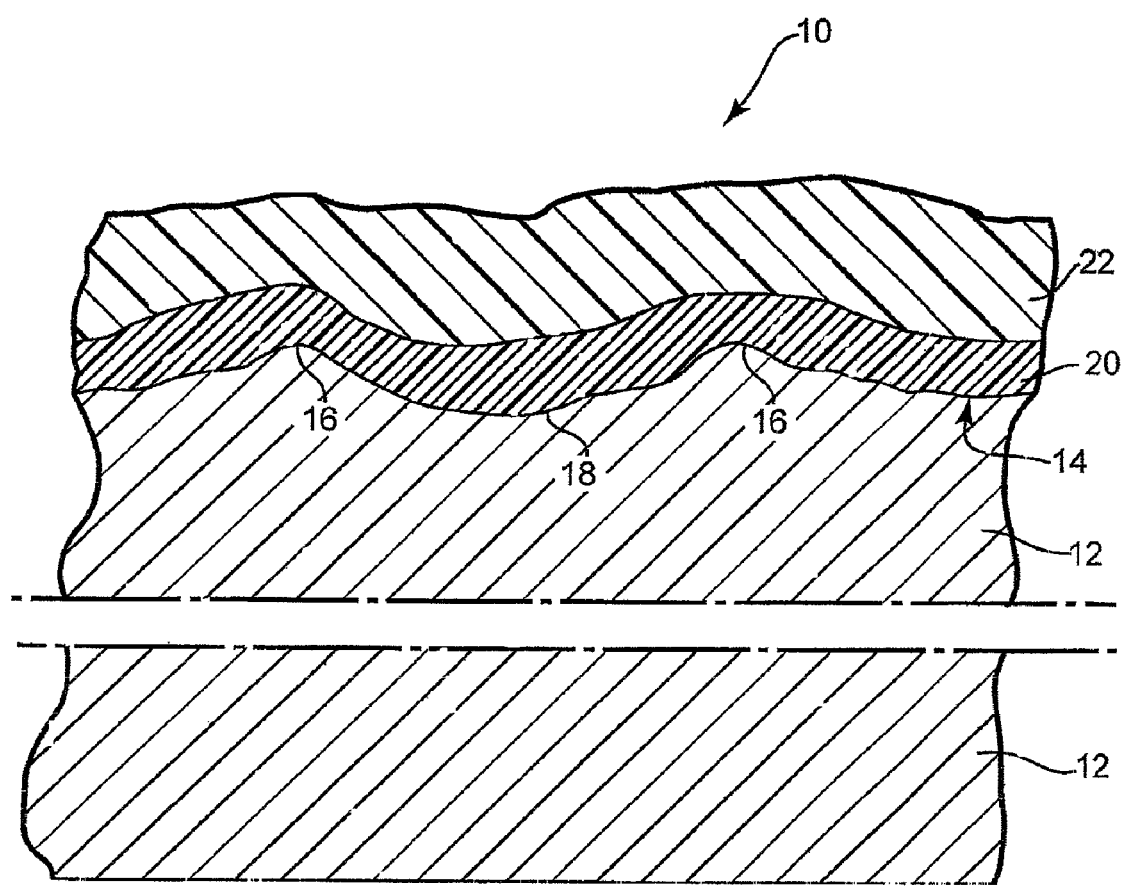

COATING SYSTEM FOR CEMENT COMPOSITE ARTICLES

CROSS-REFERENCE TO RELATED APPLICATION

This application claims priority from U.S. provisional patent application Ser. Nos. 60/802,186, filed May 19, 2006, and 60/898,620 filed on Jan. 30, 2007, the disclosures of which are incorporated herein by reference.

BACKGROUND OF THE INVENTION

Cement composite articles are becoming more and more common for use in building materials. Many of these articles are prepared from inexpensive materials, such as cement, wood (cellulose) fibers, natural (glass) fibers and polymers. These articles usually are prepared in the form of cement fiberboard substrates such as siding panels and boards. The substrate or articles can be made using methods such as extrusion or using a Hatschek machine.

In northern climates, damage from repeated freezing and thawing of water absorbed into the cement fiberboard substrate represents a significant problem. Continued exposure to moisture, freeze-thaw cycles, UV exposure and atmospheric carbon dioxide can cause physical and chemical changes in articles made from cement fiberboard compositions over time. Coating systems or coating compositions can prevent exposure to the elements such as UV light, carbon dioxide and water, or can help reduce the damage that can occur due to exposure to these elements. Several such systems are available for protecting cement fiberboard articles. However, there is a need for coating systems and coating compositions that provide a superior seal, have the ability to cure rapidly or can provide improved results when an article coated with the composition is submitted to wet adhesion testing and multiple freeze-thaw cycles.

SUMMARY

The present invention provides in one aspect a coated article comprising a cement fiberboard substrate and a coating system applied to the substrate. The coating system preferably includes (i) an epoxy-functional coating composition comprising oxirane groups, and (ii) a water-based coating composition, distinct from the epoxy-functional coating composition, and the coating system comprises a polymer having one or more epoxide-reactive functional groups that can react with the oxirane groups.

In another aspect, the invention provides a method for preparing a coated article, which method comprises providing a cement fiberboard substrate, coating at least a portion of the substrate with the above-described coating system and radiation-curing the coating.

The above summary of the present invention is not intended to describe each disclosed embodiment or every implementation of the present invention. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWING

FIG. 1 is a schematic cross-sectional view of a coated fiber cement article.

Like reference symbols in the various figures of the drawing indicate like elements. The elements in the drawing are not to scale.

DETAILED DESCRIPTION

An "epoxy coating system" or "epoxy resin system" means a multi-component coating system having at least two components, a first component having oxirane groups (e.g., epoxy-functional coating composition) and a second component having reactive groups (e.g., epoxide-reactive functional groups) that can react with the oxirane group. These groups can react to cure, polymerize or crosslink the coating system.

A "latex" polymer means a dispersion or emulsion of polymer particles formed in the presence of water and one or more secondary dispersing or emulsifying agents (e.g., a surfactant, alkali-soluble polymer or mixtures thereof) whose presence is required to form the dispersion or emulsion. The secondary dispersing or emulsifying agent is typically separate from the polymer after polymer formation. In some embodiments a reactive dispersing or emulsifying agent may become part of the polymer particles as they are formed.

A "water-dispersible" polymer means a polymer which is capable of being combined by itself with water, without requiring the use of a secondary dispersing or emulsifying agent, to obtain an aqueous dispersion or emulsion of polymer particles having at least a one month shelf stability at normal storage temperatures.

The terms "a," "an," "the," "at least one," and "one or more" are used interchangeably. Thus, for example, a coating composition that comprises "an" amine can be interpreted to mean that the coating composition includes "one or more" amines.

The recitation of numerical ranges by endpoints includes all numbers subsumed within that range (e.g., 1 to 5 includes 1, 1.5, 2, 2.75, 3, 3.80, 4, 5, etc.).

The term "comprises" and variations thereof does not have a limiting meaning where such term appears in the description or claims. Thus, for example, a composition comprising a wax compound means that the composition includes one or more wax compounds.

The terms "acrylate esters" and "methacrylate esters" refer to esters of acrylic acid and esters of methacrylic acid, respectively. They may be referred to as (meth)acrylates or (meth)acrylate esters.

The term "olefinic compound" refers to any monomer, oligomer or polymer containing reactive ethylenic unsaturation, such as vinyls, (meth)acrylates, vinyl ethers, allyl ethers, vinyl esters, unsaturated oils (including mono, di and triglycerides), unsaturated fatty acids, and the like. The term "olefinic group" refers to the reactive ethylenic unsaturated functional group in an olefinic compound.

In one aspect, the invention provides a coated article comprising a cement fiberboard substrate, including, for example, a cement fiberboard siding product or other cement composite article. The coating system includes (i) an epoxy-functional coating composition, and (ii) a water-based coating composition, distinct from the epoxy-functional coating composition. The coating system includes a polymer having one or more epoxide-reactive functional groups, e.g., an amine, that can react with an oxirane group in the epoxy-functional coating composition. Additional coatings, if desired, may be applied over the coating system. For example, in one preferred embodiment the coating comprises a two-component epoxy coating system, followed by a latex primer or topcoat. In one embodiment, the coating system includes two or more coating compositions that may be applied in one or more layers (preferably two or more layers), wherein each of the two or more coating compositions is preferably an aqueous composition or the mixture of two compositions forms an aqueous composition, e.g., on the substrate.

In preferred embodiments, the coating system has the adhesion and water-resistance properties of an epoxy system and the weathering properties of a latex or water-dispersible polymer coating.

Referring to FIG. 1, a coated article 10 of the present invention is shown in schematic cross-sectional view. Article 10 includes a cement fiberboard substrate 12. Substrate 12 typically is quite heavy and may for example have a density of about 1 to about 1.6 g/cm$^3$ or more. The first major surface 14 of substrate 12 may be embossed with small peaks or ridges 16 and valleys 18, e.g., so as to resemble roughsawn wood. Major surface 14 may have a variety of other surface configurations, and may resemble a variety of building materials other than roughsawn wood. Layer or layers 20 of the disclosed coating system lie atop and partially penetrate surface 14, and desirably are applied to article 10 at the location where article 10 is manufactured. Layer(s) 20 help to protect substrate 12 against one or more of exposure to moisture, freeze-thaw cycles, UV exposure or atmospheric carbon dioxide. Layer(s) 20 also may provide a firmly-adhered base layer upon which one or more firmly-adhered layers of final topcoat 22 may be formed. Final topcoat 22 desirably is both decorative and weather-resistant, and may be applied to article 10 at the location where article 10 is manufactured or after article 10 has been attached to a building or other surface.

A variety of cement fiberboard substrates may be employed in the disclosed articles. The disclosed substrates typically include cement and a filler. Exemplary fillers include wood, fiberglass, polymers or mixtures thereof. The substrates can be made using methods such as extrusion, the Hatschek method, or other methods known in the art. See, e.g., U.S. patent application Ser. No. US 2005/0208285 A1 (corresponds to International Patent Application No. WO 2005/071179A1); Australian Patent Application No. 2005100347; International Patent Application No. WO 01/68547 A1; International Patent Application No. WO 98/45222 A1; U.S. patent application Ser. No. US 2006/0288909 A1; and Australian Patent Application No. 198060655 A1. Non-limiting examples of such substrates include siding products, boards and the like, for uses including fencing, roofing, flooring, wall boards, shower boards, lap siding, vertical siding, soffit panels, trim boards, shaped edge shingle replicas and stone or stucco replicas. One or both major surfaces of the substrate may be profiled or embossed to look like a grained or roughsawn wood or other building product, or scalloped or cut to resemble shingles. The uncoated substrate surface typically contains a plurality of pores with micron- or submicron-scale cross-sectional dimensions.

A variety of suitable fiber cement substrates are commercially available. For example, several preferred fiber cement siding products are available from James Hardie Building Products Inc. of Mission Viejo, Calif., including those sold as HARDIEHOME™ siding, HARDIPANEL™ vertical siding, HARDIPLANK™ lap siding, HARDIESOFFIT™ panels, HARDITRIM™ planks and HARDISHINGLE™ siding. These products are available with an extended warranty, and are said to resist moisture damage, to require only low maintenance, to not crack, rot or delaminate, to resist damage from extended exposure to humidity, rain, snow, salt air and termites, to be non-combustible, and to offer the warmth of wood and the durability of fiber cement. Other suitable fiber cement siding substrates include AQUAPANEL™ cement board products from Knauf USG Systems GmbH & Co. KG of Iserlohn, Germany, CEMPLANK™, CEMPANEL™ and CEMTRIM™ cement board products from Cemplank of Mission Viejo, Calif.; WEATHERBOARDS™ cement board products from CertainTeed Corporation of Valley Forge, Pa.; MAXITILE™, MAXISHAKE™ AND MAXISLATE™ cement board products from MaxiTile Inc. of Carson, Calif.; BRESTONE™, CINDERSTONE™, LEDGESTONE™, NEWPORT BRICK™, SIERRA PREMIUM™ and VINTAGE BRICK™ cement board products from Nichiha U.S.A., Inc. of Norcross, Ga., EVERNICE™ cement board products from Zhangjiagang Evernice Building Materials Co., Ltd. of China and E BOARD™ cement board products from Everest Industries Ltd. of India.

The disclosed coating systems may be provided in a variety of embodiments: (i) a first layer having oxirane groups (epoxy-functional coating composition) can be applied, followed by a layer having epoxide-reactive functional groups in the water-based coating composition, e.g., a functionalized latex; (ii) a first layer including a mixture of an epoxy-functional coating composition and an epoxide-reactive composition can be applied, followed by a latex primer or topcoat; (iii) a first layer having epoxide-reactive functional groups in the water-based composition can be applied, followed by a layer having oxirane groups (epoxy-functional coating composition); and (iv) a first layer including a mixture of an epoxy-functional coating composition and an epoxide-reactive composition can be applied, followed by a functionalized latex primer or topcoat.

According to one embodiment, an epoxy coating system is applied to the fiber cement substrate. The epoxy coating system is typically a multi-component coating system that includes an epoxy coating system such as those described in International Patent Application No. WO 2008/018910 A1. Epoxy-based coatings include multi-functional epoxy-functional coatings, e.g., resins (e.g., di-, tri-, tetra-, and other multi-functional epoxy resins) that are prepared from aliphatic or aromatic starting materials. Aliphatic starting materials are presently preferred in cases where the starting material might be exposed for prolonged periods to UV radiation. Examples of such multi- functional epoxy resins include the reaction products of epoxy containing compounds (e.g., epichlorohydrin) with multi-functional alcohols or acids.

In another embodiment, an epoxy resin can be prepared by reacting the required proportions of a polyol compound with epichlorohydrin in an alkaline medium. The desired alkalinity can be obtained by adding basic substances, such as sodium or potassium hydroxide, preferably in stoichiometric excess to the epichlorohydrin. The reaction temperature is from about 50° C. to about 150° C. Heating is continued for several hours to effect the reaction and the product is then washed free of salt and base. Procedures for such reactions are generally known in the art and disclosed, for example, in U.S. Pat. No. 2,633,458. For example, epichlorohydrin may be reacted with the following exemplary alcohols or acids (or mixtures of such materials) to form an epoxy resin: ethylene glycol, propylene glycol, 1,3-propanediol, 1,4-butanediol, 1,3-butanediol, 2-methyl-1,3-propanediol, neopentyl glycol, 2,2-butylethyl propanediol, hexanediol, diethylene glycol, dipropylene glycol, polyethylene glycols, polypropylene glycols, cyclohexane dimethylol, 2,2,3-trimethylpentanediol, trimethyol propane ("TMP"), ethoxylated TMP, propoxylated TMP, pentaerythritol, ethoxylated pentaerythritol, propoxylated pentaerythritol, dipentaerythritol, tripentaerythritol, ethoxylated and propoxylated di and tri-pentaerythritol, hydroxypivalyl hydroxypivalate, bisphenol A, hydrogenated bisphenol A, ethoxylated and propoxylated hydrogenated bisphenol A, isosorbide, malonic acid, succinic acid, glutaric acid, adipic acid, pimelic acid, hexahydrophthalic acid, 1,3- and 1,4 cyclohexanedicarboxylic acid, chlorendic acid, glycolic acid, lactic acid, caprolactone and the like. Other alcohols or acids may be used as well.

Preferred epoxy resins are characterized by a molecular structure that includes at least one oxirane chemical group. The epoxy resins may be a low molecular weight molecule (e.g., having a weight average molecular weight less than about 1000 Daltons), or may be in the form of a higher molecular weight molecule (e.g., having a weight average molecular weight greater than about 1000 Daltons). Preferred epoxy resins have a molecular weight between 150 and 25,000, more preferably between 150 and 10,000, and most preferably between 150 and 2,000 Daltons. Preferred epoxy resins have an epoxy equivalent weight (EEW) of between 75 and 10,000, more preferably between 100 and 7500, and most preferably between 120 and 5000 gm/epoxy group. In some embodiments, the epoxy resin has a plurality of oxirane groups and is capable of functioning as a cross-linker. The water-based coating composition could utilize a latex or water-dispersible polymer with epoxy functionality. In this embodiment, the epoxy functional polymer could crosslink with the amine present in the two-component epoxy. Epoxy functionality may be incorporated into a latex polymer, for example, by using glycidyl methacrylate.

The epoxy resin can be reacted or crosslinked with an active hydrogen compound, such as amines, acids, acetoacetyl, hydroxyl, etc. Exemplary amines include amidoamines such as the EPIKURE™ 3000 series from Hexion, polyamines such as the EPIKURE 3100 series from Hexion, aliphatic and modified aliphatic amines such as the EPIKURE 3200 series from Hexion, cycloaliphatic amines such as the EPIKURE 3300 series from Hexion, waterborne/water dispersed amines such as EPIKURE 6870, 8290, 8535, 8536, 8537 and 8540 from Hexion, dicyandiamides such as the Omnicure DDA series from CVC Specialty Chemicals, polyoxyalkyleneamines such as the JEFFAMINE™ series from Huntsman, as well as other monomeric amines such as isophorone diamine, piperazine, and the like.

The ratio of epoxy functionality to active hydrogen functionality (e.g., amino-functionality) is generally controlled by the equivalent weight and mixing weight ratio of each component. Substrate morphology and porosity and the desired application viscosity determine the desired optimal ratio. Moreover, the epoxy-functional and active hydrogen-functional components may be applied at differing percent solids (percent non-volatile material) or differing wet film thicknesses to obtain the desired mixing weight ratio. Preferably, the epoxy resin system has an oxirane group to active hydrogen group ratio of less than 6:1, more preferably less than 4:1 and most preferably less than 2:1. Preferably, the epoxy resin system has an oxirane group to active hydrogen group ratio of greater than 1:2, more preferably greater than 1:1.5, most preferably greater than 1:1.2, and optimally greater than 1:1.

In one embodiment, the epoxy resin is incorporated into a latex polymer. For example, the epoxy resin-latex polymer blend can be prepared by (i) adding the epoxy resin directly to the latex polymer and mixing, (ii) mixing a pre-emulsified epoxy with the latex polymer, (iii) adding the epoxy resin to the latex monomer feed during the latex synthesis, or (iv) mixing the epoxy resin and the latex polymer in a static mixer and combining the mixture with an amine crosslinker, and applying directly to an article. The epoxy can also applied by any of the methods outlined in U.S. Patent Application Ser. No. 60/773,482

Preferably, the aliphatic epoxy resin is added directly to the latex polymer to form a first part of the coating system. The active hydrogen compound (e.g., the amine component) is provided in a separate part of the coating system. By adding the aliphatic epoxy directly to the latex one can avoid the step of preparing an epoxy resin dispersion.

Epoxy-functional latex polymers may also be used. When the latex polymer is formed using an epoxy functional monomer (such as glycidyl methacrylate, GMA) the epoxy functional monomer is preferably added to the reaction vessel during the final portion of the monomer addition. In one preferred embodiment, the epoxy-functional monomer is added during the last 20% of the monomer addition. It is believed that by adding the epoxy-functional monomer late in the reaction, the epoxy groups become incorporated into the polymer particle in a better position to subsequently react with the epoxide-reactive functional groups.

In certain embodiments, one or both of the epoxide-reactive functional groups (amino-functional chemical compound) and the epoxy-functional coating composition (oxirane-functional chemical compound) may be chemically blocked to delay onset of chemical reaction until a desired time, at which time a stimulus is used to de-block the components and permit reaction. For example, amine groups may be blocked to form a ketimine, which can unblock in the presence of moisture. The blocked component may be heated to facilitate unblocking.

Preferred amino-functional chemical compounds are characterized by a molecular structure which includes at least one chemical group selected from >NH and —NH$_2$. The amino-functional chemical compound may be a low molecular weight molecule (e.g., having a weight average molecular weight less than about 1000 Daltons), or may be in a higher molecular weight molecule (e.g., having a weight average molecular, weight greater than about 1000 Daltons). Preferred amino-functional compounds have a molecular weight between 100 and 30,000 Daltons, more preferably between 200 and 10,000. Preferred amino-functional compounds have an amine equivalent weight of between 20 and 10,000, more preferably between 20 and 7,000, and most preferably between 20 and 5,000 gm/amine group. In some embodiments, the amino-functional chemical compound has a plurality of amino groups and is capable of functioning as a cross-linker.

Preferably, the epoxide-reactive functional compound, the epoxy-functional coating composition or both, are waterborne, water reducible or water dispersible two-component epoxy compositions. Exemplary epoxide-reactive functional compounds include amino-functional phenolic resins (e.g., benzoguanamine resins), and exemplary epoxy-functional coating compositions include bisphenol epoxy-functional coating compositions, as described in Wicks, Z. W. et al., Organic Coatings Science and Technology, Vol. 1, Chapter XI, pp. 1162-187.

Conventional solvent-based two-component epoxy coating systems can be highly viscous and tend to have higher emissions of volatile organic compounds (VOC) than waterborne two-part epoxy compositions. The waterborne compositions may be thinned (e.g., by adding a carrier liquid to lower the percentage of non-volatile solids and thereby lower the viscosity.

The epoxy coating systems may be classified as liquid, semi-solid and solid, depending on their molecular weight, which tends to increase in going from liquid to solid form. Although all three types of two-component epoxy coating systems may be used, the liquid and semi-solid types are presently preferred in order to minimize the required equivalent weight of epoxide-reactive functional groups needed to react with the oxirane groups in the epoxy-functional composition.

The epoxide-reactive functional groups and epoxy-functional composition are further characterized as being capable of undergoing chemical reaction (e.g., epoxidation) with at least each other, and optionally with other components present in the multi-component epoxy coating systems. For example, the epoxy coating systems may include at least one catalyst, such as an alcohol or a weak acid catalyst, suitable for catalyzing the epoxidation chemical reaction. Other catalysts or reaction initiators may also be included in the multi-component coating composition.

Other additives may be included in the multi-component epoxy coating systems to alter or improve the application characteristics of the composition to the substrate. For example, a wetting agent may be used to adjust the surface tension of one or more components of the epoxy coating systems to alter the wetting characteristics with respect to the substrate. Non-limiting examples of wetting agents include water soluble of water miscible non-ionic surfactants exhibiting an hydrophile-lipophile balance ("HLB") from about 10 to about 20.

A rheology control agent may be added to the epoxy coating systems to alter the flow or leveling characteristics of the composition upon application to the substrate. For example, a rheology control agent may be added to one or more of the components of the multi-component composition to reduce the low shear viscosity of the composition and thereby improve the leveling or penetration of the component into the porous substrate. Exemplary rheology control agents include the MODAFLOW™ resin flow modifiers (available from Cytec Industries, Inc., Charlotte, N.C.), and acrylic leveling agents manufactured under the BYK™ and DISPERBYK™ (available from Byk-Chemie, Wesel, Germany).

The multi-component coating composition may include at least one carrier liquid. The carrier liquid may be a single chemical compound, but the carrier liquid may be selected to be a blend of different chemical compounds. The carrier liquid may be aqueous, non-aqueous or substantially non-aqueous. Aqueous carriers include water as a major component, while substantially non-aqueous carrier liquids do not include water as a major component. Non-aqueous carrier liquids contain no water or negligible amounts of water. Preferably, the carrier liquid is selected to be aqueous or substantially non-aqueous. Exemplary co-solvents for use in combination with water in an aqueous or substantially non-aqueous carrier liquid include water soluble or water miscible alcohols, ketones, esters, and the like. Non-limiting examples of carrier liquids include water (which may include tap water, deionized water, distilled water, and the like), methanol, acetone, 2-butanone, ethyl acetate, and various glycol-based ethers.

The carrier liquid constituents, the amount of carrier liquid or the percent of non-volatile material (% NVM) dispersed or dissolved in the carrier liquid may be adjusted to obtain a viscosity or surface tension desirable for application of one or more of the components of the multi-component composition to the substrate. For certain non-limiting applications, a suitable weight percentage of non-volatile solids in a component of the multi-component coating composition may be from about 5% to about 60%, more preferably from about 7.5% to about 55% NVM, most preferably from about 10% to about 50% NVM expressed on a weight basis. The disclosed coating compositions preferably include at least 40 wt % water, based on the total weight of the composition. The disclosed coating compositions preferably include no more than 95 wt % water, and more preferably no more than 90 wt % water, based on the total weight of the composition.

In one optional embodiment, the multi-component composition may further comprise an aqueous dispersion of polymer particles, a silicate salt, and optionally one or more olefinic monomers or oligomers as described in International Patent Application No. WO 2007/089913 A1. These additional ingredients may be added to any of the components, though it is preferred to add the aqueous dispersion of polymer particles and the silicate salt to the epoxy component. In one embodiment, the multi-component composition, when combined, will comprise a latex polymer, potassium silicate, an epoxy oligomer (e.g., a bisphenol A containing epoxy oligomer), a polymeric amine crosslinker, and water.

A variety of polymeric materials may be employed in the disclosed aqueous dispersions of polymer particles, including: (meth)acryllics, vinyls, oil-modified polymers, polyesters, polyurethanes, polyamides, chlorinated polyolefins, and mixtures or copolymers thereof. Latex polymers are readily synthesized at modest cost and provide a preferred class of aqueous dispersions of polymer particles. Latex polymers are typically prepared through chain-growth polymerization, using one or more olefinic compounds (preferably monomers). Non-limiting examples of olefinic compounds which may be used to prepare latex polymers include ethylene, butadiene, propene, butene, iso-butene, acrylic acid, methacrylic acid, methyl acrylate, ethyl acrylate, propyl acrylate, butyl acrylate, 2-ethylhexyl acrylate, methyl methacrylate, ethyl methacrylate, propyl methacrylate, butyl methacrylate, 2-ethylhexyl methacrylate, hydroxyethyl acrylate, hydroxyethyl methacrylate, hydroxypropyl acrylate, hydroxybutyl acrylate, hydroxybutyl methacrylate, glycidyl methacrylate, 4-hydroxybutyl acrylate glycidylether, acrylamide, methylacrylamide, styrene, α-methyl styrene, vinyl toluene, vinyl acetate, vinyl propionate, allyl methacrylate, acetoacetyl ethyl methacrylate (AAEM), diacetone acrylamide, dimethylaminomethacrylate, dimethylaminomethacrylate, N-hydroxy(meth)acrylamide, vinyl ether maleate, vinyl esters of VERSATIC™ acid (VERSATIC acid is a synthetic saturated monocarboxylic acid of highly branched structure containing about 5 to about 10 carbon atoms), and mixtures thereof. Preferably, the latex polymer is a (meth)acrylic polymer.

The latex polymers are typically stabilized using one or more nonionic or anionic emulsifiers (viz., surfactants), used either alone or together. Examples of nonionic emulsifiers include tert-octylphenoxyethylpoly(39)-ethoxyethanol, dodecyloxypoly(10)ethoxyethanol, nonylphenoxyethyl-poly(40)ethoxyethanol, polyethylene glycol 2000 monooleate, ethoxylated castor oil, fluorinated alkyl esters and alkoxylates, polyoxyethylene (20) sorbitan monolaurate, sucrose monococoate, di(2-butyl)phenoxypoly(20)ethoxyethanol, hydroxyethylcellulosepolybutyl acrylate graft copolymer, dimethyl silicone polyalkylene oxide graft copolymer, poly(ethylene oxide)poly(butyl acrylate) block copolymer, block copolymers of propylene oxide and ethylene oxide, 2,4,7,9-tetramethyl-5-decyne-4,7-diol ethoxylated with 30 moles of ethylene oxide, N-polyoxyethylene(20)lauramide, N-lauryl-N-polyoxyethylene(3)amine and poly(10)ethylene glycol dodecyl thioether. Examples of anionic emulsifiers include sodium lauryl sulfate, sodium dodecylbenzenesulfonate, potassium stearate, sodium dioctyl sulfosuccinate, sodium dodecyldiphenyloxide disulfonate, nonylphenoxyethylpoly (1)ethoxyethyl sulfate ammonium salt, sodium styrene sulfonate, sodium dodecyl allyl sulfosuccinate, linseed oil fatty acid, sodium or ammonium salts of phosphate esters of ethoxylated nonylphenol, sodium octoxynol-3-sulfonate, sodium cocoyl sarcocinate, sodium 1-alkoxy-2-hydroxypropyl sulfonate, sodium alpha-olefin (C14-C16) sulfonate, sulfates of hydroxyalkanols, tetrasodium N-(1,2-dicarboxy ethyl)-N-octadecylsulfosuccinamate, disodium N-octadecylsulfosuccinamate, disodium alkylamido polyethoxy sulfbsuccinate, disodium ethoxylated nonylphenol half ester of sulfosuccinic acid and the sodium salt of tert-octylphenoxyethoxypoly(39)ethoxyethyl sulfate and the like. In addition, combinations of emulsifiers can be used.

If desired, the latex polymers may be stabilized with an alkali-soluble polymer. Alkali- soluble polymers may be prepared by making a polymer with acrylic or methacrylic acid or other polymerizable acid monomer (usually greater than 10%) and solubilizing the polymer by addition of ammonia or other base. See, e.g., published U.S. patent application Nos. US 2006/0135684 A1 and US 2006/0135686 A1. Examples of alkali-soluble polymers include JONCRYLT™ 675 and JONCRYL 678. One exemplary process for preparing alkali soluble polymers is outlined in U.S. Pat. No. 5,962,571.

Latex polymers having some acidic functionality, are sometimes further stabilized by neutralization using ammonia or an amine. It has been discovered that neutralization or partial neutralization of a waterborne acetoacetyl-functional polymer with a nitrogen-containing base (e.g., ammonia or an amine) can in some situations lead to an undesirable luminescence appearance in a clear coating. Although not intended to be limiting, it is believed that this appearance may be caused by the formation of a tautomeric enol configuration or enamine configuration. The use of a nitrogen-free base (e.g., an inorganic metal base such as KOH, CaOH, NaOH, LiOH, etc.) can solve or lessen this problem for these types of coatings. Other such nitrogen-free bases may also be employed in this manner.

A water-soluble free radical initiator is typically used in the polymerization of a latex polymer. Exemplary water-soluble free radical initiators are described below. The amount of initiator is preferably from 0.01 wt. % to 3 wt. %, based on the total amount of monomer. In a redox system the amount of reducing agent is preferably from 0.01 wt. % to 3 wt. %, based on the total amount of monomer. The reaction temperature may be in the range of 10° C. to 100° C.

Exemplary commercially available latex polymers include AIRFLEX™ EF811 (available from Air Products), EPS 2505 (available from EPS/CCA) and NEOCAR™ 2300, NEOCAR 820 and NEOCAR 2535 (available from Dow Chemical Co.). Other exemplary latex polymers include the latex polymers described in co-pending U.S. patent application Ser. No. 11/560,329 filed Nov. 15, 2006.

The latex polymer may optionally also be functionalized with olefinic groups or other crosslinkable groups where it is desired to enable the latex polymer to participate in radiation curing. Exemplary functionalized latex polymers, include ROSHIELD™3120 (available from Rohm & Haas) and the AAEM-functional latex polymers disclosed in published U.S. patent application Nos. US 2006/0135684 A1, US 2006/0135686 A1, and in the above- mentioned application Ser. No. 11/560,329.

In preferred embodiments, the amount of polymer particles is from about 5 to about 90% by weight, more preferably from about 10 to about 80% by weight, and most preferably from about 15 to about 70% by weight, based on the total weight of the non-volatile components of the epoxy-based coating.

The disclosed coating systems may include one or more optional water-soluble silicate salts. Visual observation of coating compositions containing such silicate salts indicated that inclusion of the silicate salt led to improved absorption of the coating composition into cement fiberboard substrates. Examples of silicate salts include lithium silicate, potassium silicate, sodium silicate, ammonium silicate and the like. In preferred embodiments, the amount of silicate salt is from about 2 to about 50% by weight, more preferably from about 5 to about 40% by weight and most preferably from about 10 to about 35% by weight, based on the total weight of the non-volatile components. Silicate salts are available through a variety of chemical suppliers. For example, sodium silicate (sometimes referred to as waterglass) is available in a variety of forms including sodium orthosilicate ($Na_4SiO_4$), sodium metasilicate ($Na_2SiO_3$), sodium polysilicate ($(Na_2SiO_3)_n$) and sodium pyrosilicate ($Na_6Si_2O_7$). Sodium silicate and potassium silicate are available from PQ Corporation, Valley Forge, Pa.

A variety of olefinic compounds may be used in the disclosed coating systems. The olefinic compounds are distinct from the aqueous dispersion of polymer particles, and are carbon-containing compounds having at least one site of unsaturation which can react, optionally in the presence of an initiator, to provide polymeric or crosslinked products. Non-limiting examples of olefinic compounds include monomers such as (meth)acrylates, vinyls, vinyl ethers, allyl ethers, vinyl esters, unsaturated oils (including mono-, di- and triglycerides), unsaturated fatty acids, and the like or mixtures thereof. The olefinic compounds also include oligomers or polymers having at least one site of unsaturation which can react, optionally in the presence of an initiator, to provide polymeric or crosslinked products.

Exemplary olefinic monomers include (meth)acrylate esters of unsubstituted or substituted $C_1$-$C_{15}$ alcohols such as tripropylene glycol, isobornyl alcohol, isodecyl alcohol, phenoxyethyl alcohol, tris-hydroxyethyl isocyanurate, trimethylolpropane ethoxylate (TMPTA), ditrimethylolpropane ethoxylate (diTMPTA), hexanediol, ethoxylated neopentyl glycol, propoxylated neopentyl glycol, ethoxylated phenol, polyethylene glycol, bisphenol A ethoxylate, trimethylolpropane, propoxylated glycerol, pentaerythritol, tetrahydrofurfuryl alcohol, β-carboxyethyl alcohol, or combination thereof. For example, the olefinic monomer may be isobornyl (meth)acrylate, isodecyl (meth)acrylate, phenoxyethyl (meth)acrylate, trimethylolpropane tri(meth)acrylate, alkoxylated cyclohexane dimethanol di(meth)acrylate, trimethylolpropane ethoxylate tri(meth)acrylate, dipropylene glycol di(meth)acrylate, tripropylene glycol di(meth)acrylate, hexanediol di(meth)acrylate, tetrahydrofurfuryl(meth) acrylate, pentaerythritol tri(meth)acrylate, pentaerythritol tetra(meth)acrylate, di-(trimethyolpropane tetra(meth)acrylate), propoxylated glycerol tri(meth)acrylate, beta-carboxyethyl (meth)acrylate, bisphenol A ethoxylate di(meth)acrylate, ethoxylated neopentyl glycol di(meth)acrylate, propoxylated neopentyl glycol di(meth)acrylate, di-(trimethylolpropane tetra(meth)acrylate) or combination thereof. Preferred olefinic monomers include trimethylolpropane tri (meth)acrylate, bisphenol A ethoxylate di(meth)acrylate, propoxylated glycerol tri(meth)acrylate, trimethylolpropane ethoxylate tri(meth)acrylate, di-(trimethyolpropane tetra (meth)acrylate), or combination thereof. The olefinic monomer may contain a ($C_1$-$C_{15}$) alcohol radical such as hydroxymethyl, 1-hydroxyethyl, 2-hydroxyethyl, 1-hydroxypropyl, 2-hydroxypropyl, 3-hydroxypropyl, 1-hydroxybutyl, 4-hydroxybutyl, 1-hydroxypentyl, 5-hydroxypentyl, 1-hydroxyhexyl, 6-hydroxyhexyl, 1,6-dihydroxyhexyl, 1,4-dihydroxybutyl, and the like.

Exemplary allyl ether monomers contain one or more allyl ether groups which typically are bonded to a core structural group which can be based on a wide variety of polyhydric alcohols. Non-limiting examples of polyhydric alcohols include neopentyl glycol, trimethylolpropane, ethylene glycol, propylene glycol, butylene glycol, diethylene glycol, trimethylene glycol, triethylene glycol, trimethylolethane, pentaerythritol, glycerol, diglycerol, 1,4-butanediol, 1,6-hexanediol, 1,4-cyclohexanedimethanol, and any of the other polyols mentioned above in connection with the (meth)acrylate esters. Other exemplary allyl ether monomers include hydroxyethyl allyl ether, hydroxypropyl allyl ether, trimethylolpropane monoallyl ether, trimethylolpropane diallyl ether, trimethylolethane monoallyl ether, trimethylolethane diallyl ether, glycerol monoallyl ether, glycerol diallyl ether, pentaerythritol monoallyl ether, pentaerythritol diallyl ether, pentaerythritol triallyl ether, 1,2,6-hexanetriol monoallyl ether, 1,2,6-hexanetriol diallyl ether, and the like. Preferred allyl ethers include poly propoxylated and ethoxylated forms of allyl ethers.

Exemplary vinyl ether monomers contain one or more vinyl ether groups and include 4-hydroxybutyl vinyl ether, 1,4-cyclohexanedimethanol monovinyl ether, 1,4-cyclohexanedimethanol divinyl ether, ethylene glycol monovinyl ether, ethylene glycol divinyl ether, diethylene glycol monovinyl ether, diethylene glycol divinyl ether, triethylene glycol divinyl ether, and the like. Preferred vinyl ether monomers include propoxylated or ethoxylated forms of vinyl ether monomers.

The disclosed coating systems or coating compositions preferably contain about 0 to about 40% by weight, more preferably from about 3 to about 30% by weight, and most preferably from about 7.5 to about 25% by weight separate olefinic compounds based on the total weight of the non-volatile components in the coating system.

Other optional components for use in the coating systems herein are described in Koleske et al., Paint and Coatings Industry, April, 2003, pages 12-86. Typical performance enhancing additives that may be employed include surface active agents, pigments, colorants, dyes, surfactants, dispersants, defoamer's, thickeners, heat stabilizers, leveling agents, coalescents, biocides, mildewcides, anti-cratering agents, curing indicators, plasticizers, fillers, sedimentation inhibitors, ultraviolet light absorbers, optical brighteners, and the like to modify properties.

The coating compositions may also contain an optional coalescent and many coalescents are known in the art. The optional coalescent is preferably a low VOC coalescent such as is described in U.S. Pat. No. 6,762,230.

According to one embodiment, a water-based coating composition may be applied to the substrate after it has been coated with the epoxy-functional coating composition. The water-based coating composition may be applied "wet-on-wet" to the substrate after the epoxy-functional coating composition has been applied (e.g., the epoxy-functional coating composition is applied first and the water-based coating composition is applied while the epoxy-based system is still a fluid) or the water-based coating composition may be applied to the substrate after the epoxy-functional coating composition has been allowed to first dry or harden (or at least partially dry or harden). In another embodiment, a water-based coating composition may be applied to the substrate before it has been coated with the epoxy-functional coating composition. The epoxy-functional coating composition may be applied "wet-on-wet" to the substrate after the water-based coating composition has been applied (e.g., the water-based coating composition is applied first and the epoxy-functional coating composition is applied while the water-based coating composition is still a fluid) or the epoxy-functional coating composition may be applied to the substrate after the water-based coating composition has been allowed to first dry or harden (or at least partially dry or harden).

Exemplary water-based coating compositions include latex or water-dispersible polymer systems, wherein the latex or water-dispersible polymer itself contains epoxide-reactive functional groups (e.g., active hydrogen-containing groups) that preferably can react with the epoxy-functional coating composition. Preferred epoxide-reactive functional groups include: amines, acids, acetoacetyl, hydroxyl, etc. The disclosed coating systems preferably provide a chemical "crosslink" between the two separate coatings.

An exemplary latex polymer is XK-90 (available from DSM). This polymer is believed to contain amine functionality. In this embodiment, the amine functional polymer can crosslink with the oxirane groups present in the epoxy-functional coating composition. Amine functionality may be incorporated into a latex polymer, for example, by reacting propyleneimine with carboxylic acid groups present on the polymer.

Exemplary polymers having one or more acetoacetyl-functional groups are described in published U.S. patent application Nos. US 2006/0135684 A1 and US 2006/0135686 A1, which are herein incorporated by reference. Such functionalized polymers are desirable because they can become part of a crosslinked network, thereby providing advantageous coating properties. Such polymers include one or more of the following acetoacetyl-functional groups: —C(O)—R$^1$—C(O)—R$^2$, wherein preferably R$^1$ is a C$_1$ to C$_{22}$ alkylene group and R$^2$ is a C$_1$ to C$_{22}$ alkyl group; more preferably, R$^1$ is a C$_1$ to C$_4$ alkylene group and R$^2$ is a C$_1$ to C$_4$ alkyl group; and most preferably, R$^1$ is methylene (—CH$_2$—) and R$^2$ is methyl (—CH$_3$). The amount of acetoacetyl functionality in such a polymer is preferably at least 0.5%, more preferably at least 1%, and most preferably at least about 2%. The amount of acetoacetyl functionality in such a polymer is preferably no more than 60%, more preferably no more than 40%, and most preferably no more than 30%.

Exemplary epoxide-reactive functional polymers include polyurethanes, vinyls, polyamides, chlorinated polyolefins, acrylics, oil-modified polymers, polyesters, and mixtures or copolymers thereof, for example. Such polymer's are readily synthesized and made to include epoxide-reactive functional groups using conventional techniques.

Preferred acetoacetyl-functional polymers include an acetoacetyl-functional polyurethane, epoxy, polyamide, chlorinated polyolefin, acrylic, oil-modified polymer, vinyl, polyester, or mixtures or copolymers thereof.

Acetoacetyl functionality may be incorporated into the polymer through the use of: acetoacetoxyethyl acrylate, acetoacetoxypropyl methacrylate, allyl acetoacetate, acetoacetoxybutyl methacrylate, 2,3-di(acetoacetoxy)propyl methacrylate, 2-(acetoacetoxy)ethyl methacrylate, t-butyl acetoacetate, diketene, and the like, or combinations thereof. In general, any polymerizable hydroxy functional or other active hydrogen containing monomer can be converted to the corresponding acetoacetyl functional monomer by reaction with diketene or other suitable acetoacetylating agent (see, e.g., Comparison of Methods for the Preparation of Acetoacetylated Coating Resins, Witzeman, J. S.; Dell Nottingham, W.; Del Rector, F. J. Coatings Technology; Vol. 62, 1990, 101 (and references contained therein)). In preferred coating compositions, the acetoacetyl functional group is incorporated into the polymer via 2-(acetoacetoxy)ethyl methacrylate, t-butyl acetoacetate, diketene, or combinations thereof.

In certain embodiments, the acetoacetyl functional latex polymer is preferably prepared through chain-growth polymerization, using, for example, 2-(acetoacetoxy)ethylmethacrylate (AAEM) and one or more olefinic monomers. Examples of olefinic monomers are selected from the group consisting of acrylic acid, methacrylic acid, methyl acrylate, ethyl acrylate, propyl acrylate, butyl acrylate, 2-ethylhexyl acrylate, methyl methacrylate, ethyl methacrylate, propyl methacrylate, butyl methacrylate, 2-ethylhexyl methacrylate, hydroxyethyl acrylate, hydroxyethyl methacrylate, hydroxybutyl acrylate, hydroxybutyl methacrylate, glycidyl methacrylate, 4-hydroxybutyl acrylate glycidylether, acrylamide, methylacrylamide, styrene, a-methyl styrene, ethylene, vinyl toluene, vinyl acetate, vinyl propionate, allyl methacrylate, vinylester of VERSATIC acid (VeoVA), and mixtures thereof.

If desired, the water-based coating composition may include a polymer that has a mixture of different epoxide-reactive functional groups. For example, a polymer may be utilized having both acetoacetyl-functionality and acidic functionality. Alternatively, the water-based coating composition may include a mixture of different polymers having different EBC functional groups. Furthermore, if desired, a multi-stage polymer, such as is described in U.S. patent application Ser. No. 11/560,329, may be used. Such polymers are especially preferred where crush resistance is a desired property.

Coating compositions preferably include an acetoacetyl-functional polymer in an amount of at least 30, more preferably at least 45, and even more preferably at least 55 wt %, based on the combined weight of any olefinic compound and the acetoacetyl-functional polymer component of the composition. The disclosed coating compositions preferably include an acetoacetyl-functional polymer in an amount of no more than 95, more preferably no more than 90, and even more preferably no more than 85 wt %, based on the combined weight of any olefinic compound and the acetoacetyl-functional polymer component of the composition.

Another embodiment includes an acid-functional, acetoacetyl-functional polyurethane dispersion polymer that has been neutralized or partially neutralized using a suitable base.

Another embodiment includes an acid-functional, acetoacetyl-functional polyester polymer that has been neutralized or partially neutralized using a suitable base.

In certain embodiments, the epoxide-reactive functional polymer (e.g., acetoacetyl-functional polymer) of the composition is a water dispersible polymer. Preferred epoxide-reactive functional water dispersible polymers include alkyds, polyesters, and polyurethanes. Such polymers may be prepared by any method known in the art. For example a water-dispersible polyester can be prepared by reacting one or more polybasic acids with one or more polyols to give a polymer with excess hydroxyl functionality. The resulting polyester may be further reacted with either t-butyl acetoacetate, or diketene to incorporate acetoacetyl-functionality onto the polymer, and with a suitable anhydride such as trimellitic anhydride to render the polyester acid functional. The resulting acid functionality may then be neutralized with a suitable base to render the polyester water dispersible.

An example of a method of preparing a water-dispersible alkyd includes reacting one or more of the alcoholysis products of an oil and polyol, fatty acids, monoglycerides or diglycerides and one or more polybasic acids with one or more polyols to give a polymer with excess hydroxyl functionality. The resulting alkyd may be further reacted with either t-butyl acetoacetate, or diketene to incorporate acetoacetyl-functionality onto the polymer, and with an anhydride such as trimellitic anhydride to render the alkyd acid functional. The resulting acid functionality may then be neutralized with a suitable base to render the alkyd water dispersible.

Exemplary oils or fatty acids derived therefrom include compounds such as linseed oil, safflower oil, tall oil, cotton seed, ground nut oil, tung oil, wood oil, ricinene oil or, preferably, sunflower oil, soya oil, castor oil, dehydrated castor oil, and the like. These oils or fatty acids can be used alone or as a mixture of one or more of the oils or fatty acids. Preferred fatty acids are soya fatty acids, dehydrated castor fatty acids, linolenic fatty acids, ricinoleic fatty acids, and linoleic fatty acids.

Exemplary polyols useful for preparing polyester or alkyd polymers include compounds such as aliphatic, cycloaliphatic or araliphatic alcohols having 1 to 6, preferably 1 to 4, hydroxy groups attached to nonaromatic or aromatic carbon atoms. Examples of polyols include, ethylene glycol, 1,2-propanediol, 1,3-propanediol, 1,2-butanediol, 1,3-butanediol, 1,4-butanediol, 2-ethyl-1,3-propanediol, 2-methylpropanediol, 2-butyl2-ethylpropanediol, 2-ethyl-1, 3-hexanediol, 1,3 neopentyl glycol, 2,2-dimethyl-1,3-pentanediol, 1,6 hexanediol, 1,2- and 1,4-cyclohexanediol, bisphenol A, 1,2- and 1,4-bis(hydroxymethyl)cyclohexane, bis(4-hydroxycyclohexyl)methane, adipic acid bis-(ethylene glycol ester), ether alcohols, such as diethylene glycol and triethylene glycol, dipropylene glycol, perhydrogenated bisphenols, 1,2,4-butanetriol, 1,2,6-hexanetriol, trimethylolethane, trimethylolpropane, trimethylolhexane, glycerol, pentaerythritol, dipentaerythritol, mannitol and sorbitol, and also chain-terminating monoalcohols having 1 to 8 carbon atoms such as propanol, butanol, cyclohexanol, benzyl alcohol, hydroxypivalic acid, and mixtures thereof.

Exemplary polybasic acids useful in preparing polyesters or alkyds include compounds such as aliphatic, cycloaliphatic saturated or unsaturated or aromatic polybasic carboxylic acids such as dicarboxylic, tricarboxylic and tetracarboxylic acids. These compounds can be used alone or as a mixture of one or more polybasic acids. Non-limiting examples of polybasic acids include phthalic acid, isophthalic acid, adipic acid, terephthalic acid, tetrahydrophthalic acid, hexahydrophthalic acid, endomethylenetetrahydrophthalic acid, succinic acid, glutaric acid, sebacic acid, azelaic acid, trimellitic acid, pyromellitic acid, fumaric and maleic acid and the like, or mixtures thereof. Polybasic acids also include anhydrides of the polybasic acids such as maleic anhydride, phthalic anhydride, succinic anhydride, tetrahydrophthalic anhydride, hexahydrophthalic anhydride, trimellitic anhydride, or mixtures thereof. The anhydride compounds can be used alone or in a mixture with one or more polybasic acids.

Exemplary bases to render the polyester or alkyd water dispersible include bases such as sodium hydroxide, potassium hydroxide, lithium hydroxide, calcium hydroxide, ammonia, triethylamine, and dimethyl ethanol amine.

The water-based coating compositions may also optionally include olefinic compounds that are distinct from the epoxy and epoxide-reactive functional group containing polymers. Such compounds may be monomers, oligomers, polymers, or mixtures thereof. The olefinic compounds may be used in various combinations and may also provide a crosslinkable diluent function to the coating compositions.

The disclosed coating compositions may be formulated, e.g., by including olefinic compounds, so as to be radiation-curable. For example, an aqueous-based, ultraviolet ("UV") radiation-curable coating composition containing an acetoacetyl-functional polymer and an acrylate or methacrylate functional (preferably, multifunctional) compound may be made. The radiation curable coating compositions may be cured using, e.g., visible light, ultra violet light, electron beam, and the like. An initiator system is not required for electron beam curing but for other radiation sources typically will be chosen based on the particular type of curing energy (e.g., UV, visible light or other energy) and curing mechanism (e.g., free-radical, cationic or other curing mechanism) employed. Thus in one preferred embodiment, the coating system is electron beam curable and does not require an initiator. In another preferred embodiment, the coating system is UV curable and free-radically polymerizable, and includes a UV photoinitiator system which generates free radicals in response to UV light and thereby cures the coating. The amount of olefinic compounds in the composition can be at least 2.5 wt %, more preferably in an amount of at least 7.5 wt %, and even more preferably in an amount of at least 10 wt %, based on the combined weight of the olefinic compound and the acetoacetyl-functional polymer component of the composition. When present, the disclosed coating compositions preferably include an olefinic compound in an amount of no more than 70, more preferably in an amount of no more than 50, and even more preferably in an amount of no more than 40 wt %, based on the combined weight of the olefinic compound and the acetoacetyl-functional polymer component of the composition.

The disclosed coating compositions may be hardened in a variety of ways and may optionally include one or more initiators, coinitiators or synergists such as are disclosed in published U.S. patent application Ser. No. US 2006/0135686 A1. Examples of initiators include photoinitiators, thermal initiators, and catalysts for auto-oxidative cure. In one embodiment, exposing the coating composition to radiation such as ultraviolet or visible light hardens the coatings. These coating compositions typically include a free-radical initiator, particularly a photoinitiator that induces the curing reaction upon exposure to light. The photoinitiator, when used, is preferably present in an amount of at least 0.1 wt %, based on the total weight of the coating composition. The photoinitiator, when used, is preferably present in an amount of no greater than 10 wt %, based on the total weight of the coating composition. Such coatings may be cured by exposing the coating to radiation having a wavelength in the range of about 100 to 800 nm, more preferably, 200 to 800 nm. Such coatings may be preferably exposed to 100 to 5,000, more preferably 300 to 2,000, and even more preferably 500 to 1,750 Mjoules/ $cm^2$. Coating compositions may also be cured by thermal means or other forms of radiation such as electron beam.

Certain coating compositions may also include one or more of a group of ingredients that can be called performance enhancing additives. Typical performance enhancing additives that may be employed include surface active agents, pigments, colorants, dyes, surfactants, thickeners, heat stabilizers, leveling agents, anti-cratering agents, curing indicators, plasticizers, fillers, sedimentation inhibitors, ultraviolet-light absorbers, optical brighteners, and the like to modify properties.

Coating compositions may include a surface-active agent that modifies the interaction of the coating composition with the substrate (or an underlying previously applied coating), in particular, the agent can modify the ability of the composition to wet the substrate (or previously applied coating). If used, the surface active agent is preferably present in an amount of no greater than about 5 wt %, based on the total weight of the coating composition. Exemplary surface active agents include polydimethyl-siloxane surface active agents (such as those commercially available under the trade designations SILWET L-760 and SILWET L-7622 from OSI Specialties, South Charleston, W. Va., or BYK 306, BYK 333, and BYK 346 from Byk-Chemie, Wallingford, Conn.) and fluorinated surface active agents (such as that commercially available as FLUORAD FC-430 from 3M Co., St. Paul, Minn.). The surface active agents may include a defoamer. Defoamers include polysiloxane defoamers (such as a methylalkylpolysiloxane like that commercially available under the trade designation BYK 077 or BYK 500 from Byk-Chemie) or polymeric defoamer's (such as that commercially available under the trade designation BYK 051 from Byk-Chemie).

For some applications, a coating that is opaque, colored, pigmented or has other visual characteristics is desired. Agents to provide such properties can also be included in the coating compositions. Pigments for use with the disclosed coating compositions are known in the art. Exemplary pigments include titanium dioxide white, carbon black, lampblack, black iron oxide, red iron oxide, yellow iron oxide, brown iron oxide (a blend of red and yellow oxide with black), phthalocyanine green, phthalocyanine blue, organic reds (such as naphthol red, quinacridone red and toulidine red), quinacridone magenta, quinacridone violet, DNA orange, or organic yellows (such as Hansa yellow). The composition can also include a gloss control additive or an optical brightener, such as that commercially available under the trade designation UVITEX OB from Ciba-Geigy.

Certain embodiments can include fillers or inert ingredients in the coating composition. Fillers and inert ingredients include, for example, clay, glass beads, calcium carbonate, talc, silicas, organic fillers, and the like. Fillers extend, lower the cost of, alter the appearance of, or provide desirable characteristics to the composition before and after curing. Exemplary fillers are known to those of skill in the art or can be determined using standard methods Fillers or inert ingredients are preferably present in an amount of at least 0.1 wt %, based on the total weight of the coating composition. Fillers or inert ingredients are preferably present in an amount of no greater than 40 wt %, based on the total weight of the coating composition.

The invention may also include other ingredients that modify properties of the curable coating composition as it is stored, handled, or applied, and at other or subsequent stages. Waxes, flatting agents, mar and abrasion additives, and other similar performance enhancing additives may be employed as required in amounts effective to upgrade the performance of the cured coating and the coating composition. Desirable performance characteristics of the coating include chemical resistance, abrasion resistance, hardness, gloss, reflectivity, appearance, or combinations of these characteristics, and other similar characteristics.

The coating systems may be applied by any number of application techniques including but not limited to brushing (e.g., using a brush coater), direct roll coating, reverse roll coating, flood coating, vacuum coating, curtain coating and spraying. The various techniques each offer a unique set of advantages and disadvantages depending upon the substrate profile, morphology and tolerable application efficiencies. Lower viscosities facilitate uniform film control. The applied film thickness may be controlled for example by varying the application rate.

The disclosed coating systems may for example be applied to a cement fiberboard substrate by roll coating. A dry film thickness (DFT) of the coating system on the cement fiberboard substrate may for example be in the range of, but not limited to 0.2-1.0 mil (0.0005 to 0.00254 cm), more preferably 0.3 to 0.8 mil (0.00076 to 0.002 cm).

It is preferred that the coated articles are coated on at least one major surface with the coating system. More preferably, the coated articles are coated on a major surface and up to four minor surfaces including any edges. Most preferably, the coated articles are coated on all (e.g., both) major surfaces, and up to four minor surfaces including any edges.

A topcoat may be applied directly to the coating system. The coating systems and coating compositions described herein may be used in place of or in addition to coatings that the prior art has categorized as "sealers," "primers" and "topcoats." However, the systems and compositions may not fit neatly into any category per se and such terms should not be limiting.

Wet adhesion testing and "freeze-thaw" cycles have been shown, under laboratory conditions, to simulate long-term outdoor exposure encountered in northern climates. A Wet Adhesion Test may be carried out as follows to evaluate adhesion of the coating system after a coated cement fiberboard substrate has been saturated with water. According to this test procedure, coated substrates (e.g., fiber cement boards) are soaked in room temperature water for 24 hours. After soaking, the boards are removed from the water and kept at room temperature for 24 hours. A six-inch (15.24 cm) length of 3M HD 250 tape is applied to the surface of the board with the long axis of the tape in the direction of any embossing patterns that may be present. The tape is firmly pressed onto the board ensuring full contact. The tape is then removed by quickly pulling it off at a 90-degree angle to the board. "Wet Adhesion" performance is rated based on the percent of coating removed from the cement board. Performance is further assessed by noting where any failure occurs. For example, failure may occur between interfacial coating layers, between the coating and the surface of the board, or within the board itself. Preferred coating systems or coating compositions typically have less than 25% coating removal, more preferably less than 15% coating removal. In addition, the failure preferably is within the board as indicated by a significant amount of fiber from the board adhering to the removed coating.

Preferred coated articles can withstand at least 30 freeze-thaw cycles, when tested according to ASTM D6944-03, Test Method A. As written, this ASTM test method recites a 30-cycle sequence. However, rather than simply grade a specimen as a "pass" at the end of 30 cycles, the test desirably is lengthened to include additional cycles. More preferably, the coated articles can withstand at least 75 freeze-thaw cycles, most preferably at least 125 freeze-thaw cycles and optimally at least 175 freeze-thaw cycles.

The disclosed coating systems or coating compositions preferably have improved, viz., lower, volatile organic content (VOC). The coating systems or coating compositions desirably have a VOC of less than about 5%, based on the total weight of the coating system, preferably a VOC of less than about 2%, more preferably a VOC of less than about 0.5%. Volatile organic compounds are defined in U.S. Pat. No. 6,048,471 (Henry) and in the U.S. Federal Register: Jun. 16, 1995, volume 60, number 111.

Preferred compositions of the second coating system include less than 10 weight %, more preferably less than 7 weight %, and most preferably less than 5 weight % volatile organic compounds (VOC) based upon the total weight of the composition.

Having thus described the preferred embodiments, those of skill in the art will readily appreciate that the teachings found herein may be applied to yet other embodiments within the scope of the claims hereto attached.

The following examples are offered to aid in understanding of the present invention and are not to be construed as limiting the scope thereof. Unless otherwise indicated, all parts and percentages are by weight.

EXAMPLES

Example 1, Runs 1-3

Run 1: A two-part "epoxy-amine" composition was prepared by mixing the following ingredients: Part 'A' contains 72 parts water and 28 parts EPI-REZ™ 3515 W60 epoxy resin; and Part 'B' contains 38 parts water and 21 parts ANQUAMINE™ 281 poly-amine.

Run 2: A two-part "epoxy-amine" composition was prepared by mixing the following ingredients: Part 'A' contains 71 parts water, 19 parts EPI-REZ 3515 W60 epoxy resin, and 10 parts EF 811 (Air Products latex); and Part 'B' contains 27 parts water and 14 parts Anquamine 287 poly-amine.

Run 3: A two-part "epoxy-amine" composition was prepared by mixing the following ingredients: Part 'A' contains 64 parts water, 14 parts EPI-REZ 3515 W60 epoxy resin, 10 parts EF 811 (Air Products latex), and 12 parts potassium silicate (KASIL 1); and Part 'B' contains 19 parts water and 10 parts ANQUAMINE 281 poly-amine.

Equal parts by weight of 'A' and 'B' are mixed and allowed to sit for a 10-minute induction period before application to a substrate. In preferred embodiments, the coating is then applied to a fiber cement article at a dry film thickness of (0.00127 to 0.001778 cm (0.5 to 0.7 mils) by either a single coating application or by two or more coating applications, and a portion of the water is removed, either by air drying, a heated drying stage or by application to a warm substrate (e.g., about 38° C.). The coated substrate may then be topcoated, e.g., using a topcoat as described in co-pending U.S. patent application Ser. No. 11/560,329. Preferred embodiments will give an improved adhesion coating system for fiber cement.

Example 2

Acetoacetyl Functional Latex Polymer

A reactor was charged with 567 parts of deionized water, and 1.5 parts RHODAPON™ UB. The reaction mixture was heated to 75° C. under a nitrogen blanket. During heating, a pre-emulsion was formed containing: 331 parts of deionized water, 56.8 parts of RHODAPON UB, 0.9 parts ammonium persulfate, 149 parts of 2-ethyl hexyl acrylate, 732 parts of butyl methacrylate, 28.1 parts of AAEM, and 28.1 parts of methacrylic acid. Once the reaction mixture reaches 75° C., 2.8 parts of ammonium persulfate were added to the reactor and the monomer feed started for a 3 hour feed rate. The reaction temperature was held between 80° C. to 85° C., during polymerization. Once the pre-emulsion feed was complete, the container was rinsed with 20 parts of deionized water and the reaction was held 30 minutes. A post reaction consisting of 0.9 parts t-butyl hydroperoxide mix with 20 parts of deionized water and 0.7 parts of isoascorbic acid mixed with 20 parts of deionized water was then added over 30 minutes. The resulting latex polymer was then cooled to 40° C. and 28% concentrate ammonia was added to adjust the pH to 7.5-8.5 and deionized water was added to adjust the weight solids to 48%.

Example 3

Multistage Acetoacetyl Functional Latex Polymer

A reactor was charged with 547 parts of deionized water, and 1.5 parts RHODAPON UB. The reaction mixture was heated to 75° C. under a nitrogen blanket. During heating, pre-emulsion 1 was formed containing: 215 parts of deionized water, 37 parts of RHODAPON UB, 0.6 parts ammonium persulfate, 103 parts of 2-ethyl hexyl acrylate, 470 parts of butyl methacrylate, 18 parts of AAEM, and 18 parts of methacrylic acid. Pre-emulsion 2 was formed containing: 116 parts of deionized water, 20 parts of RHODAPON UB, 0.3 parts ammonium persulfate, 223 parts of methyl methacrylate, 85 parts of butyl methacrylate, 10 parts of AAEM, and 10 parts of methacrylic acid. Once the reaction mixture reaches 75° C., 2.8 parts of ammonium persulfate was added to the reactor and the pre-emulsion 1 started for a 2 hour feed rate. Once pre-emulsion 1 was added, the container was rinsed with 20 parts deionized water and pre-emulsion 2 stated for a 1 hour feed rate. The reaction temperature was held between 80° C. to 85° C., during polymerization. Once the pre-emulsion 2 feeds was complete, the container was rinsed with 20 parts of deionized water and the reaction was held 30 minutes. A post reaction consisting of 0.9 parts t-butyl hydroperoxide mix with 20 parts of deionized water and 0.7 parts of isoascorbic acid mixed with 20 parts of deionized water was then added over 30 minutes. The resulting latex polymer was then cooled to 40° C. and 28% concentrate ammonia was added to adjust the pH to 7.5-8.5 and deionized water was added to adjust the weight solids to 48%.

Example 4a-c

Paint Compositions

In a mixing vessel equipped with a high-speed mixer and dispersion blade, the following ingredients were added in order (parts by weight):

| Ingredient | | Example 4a | Example 4b | Example 4c |
| --- | --- | --- | --- | --- |
| Water | | 101 | 101 | 101 |
| Cellosize QP 09-L | Thickener | 0.8 | 0.8 | 0.8 |

The above ingredients were mixed for 5 minutes or until homogenous, and then the following ingredients were added (parts by weight):

| Ingredient | | Example 4a | Example 4b | Example 4c |
| --- | --- | --- | --- | --- |
| Dehydran 1620 | Defoamer | 1.5 | 1.5 | 1.5 |
| Texanol | Co-solvent | 15 | 15 | 15 |
| Disperbyk 190 | Dispersant | 7 | 7 | 7 |
| Ammonia 26 BE | Neutralizer | 1 | 1 | 1 |
| Ti Pure R902-28 | Pigment | 220 | 220 | 220 |
| ASP 170 Alum. Silicate | Extender | 85 | 85 | 85 |

The above ingredients were mixed at high speed for 15 minutes, and then the following ingredients were added (parts by weight):

| Ingredient | | Example 4a | Example 4b | Example 4c |
| --- | --- | --- | --- | --- |
| Ammonia 26 BE | Neutralizer | 1 | 1 | 1 |

To the above was added the following in order (parts by weight):

| Ingredient | | Example 4a | Example 4b | Example 4c |
| --- | --- | --- | --- | --- |
| Water | | 46.6 | 46.6 | 6.9 |
| Example 2 latex | | 596.2 | — | — |
| Example 3 latex | | — | 596.2 | — |
| Neocryl XK 90 latex | | — | — | 636 |
| Water | | 16.7 | 16.7 | 16.7 |
| Byk 024 | Defoamer | 1 | 1 | 1 |
| Acrysol RM-2020NPR | Thickener | 1.5 | 1.5 | 1.5 |

The above were mixed for 15 minutes using moderate agitation.

Example 5

Tape Adhesion Test Results

A 15.24×21 cm board sample was prepared for testing as outlined in Example 1 and then a second system applied using the following technique.

Preheat board sample to 43° C. (~110° F.) using a convection oven set at 149° C. (300° F.). Apply approximately 5.2 grams of topcoat by spreading evenly over the surface of the board using either a bristle or foam brush. Immediately after coating the board, place it in the 149° C. (300° F.) oven until the board surface temperature reaches 60° C. (140° F.). Remove sample and allow to cool to room temperature.

Adhesion test procedures: After a board sample has been sealed, top-coated and dried, it can be tested for coating adhesion using 3M brand 250 standard tape. The adhesion of a coating system to the surface of a board may be tested after the coating system has been applied and cured/dried to the specifications of the coating system. To the surface of the board, apply at least a 7.62 cm (3 inch) strip of 3M 250 standard masking tape. Firmly press the tape to the board surface using either a rubber roller or a thumb applying a minimum of 20.67 kPa (5 psi) to the full length of the tape for 10 seconds. Allow 2 minutes for the adhesive to equilibrate on the board surface. After equilibrating, remove the tape by rapidly (equal to or less than 1 second) pulling it up at a 90 degree angle. Failure is reported as a combination of coating adhesion failure and also board surface failure.

|  | TEST 1 | TEST 2 | TEST 3 |
| --- | --- | --- | --- |
| First Coat | Example 1, Run 1 | Example 1, Run 1 | Example 1, Run 1 |
| Second Coat | Example 4a | Example 4b | Example 4c |
| % Adhesion Loss | 0% | 0% | 10% |

|  | TEST 4 | TEST 5 | TEST 6 |
| --- | --- | --- | --- |
| First Coat | Example 1, Run 2 | Example 1, Run 2 | Example 1, Run 2 |
| Second Coat | Example 4a | Example 4b | Example 4c |
| % Adhesion Loss | 0% | 0% | 10% |

|  | TEST 7 | TEST 8 | TEST 9 |
| --- | --- | --- | --- |
| First Coat | Example 1, Run 3 | Example 1, Run 3 | Example 1, Run 3 |
| Second Coat | Example 4a | Example 4b | Example 4c |
| % Adhesion Loss | 0% | 0% | 1% |

Boards were also coated according to the procedure outlined above with the second coat from Examples 4a, 4b and 4c, but without the first coat. Upon testing adhesion, all three systems exhibited approximately 50% adhesion loss.

All patents, patent applications and literature cited in the specification are hereby incorporated by reference in their entirety. In the case of any inconsistencies, the present disclosure, including any definitions therein will prevail. The invention has been described with reference to various specific and preferred embodiments and techniques. However, it should be understood that many variations and modifications may be made while remaining within the invention.

What is claimed is:

1. A coated article, comprising:
a fiber cement composite substrate; and
a coating applied to the fiber cement composite substrate, wherein the coating is formed from a water-based coating composition comprising:
an epoxy resin;
a crosslinker having epoxide-reactive functional groups;
a latex polymer, distinct from the epoxy resin; and
water;
wherein the crosslinker is provided in an amount sufficient to react with and crosslink the epoxy resin.

2. The coated article of claim 1 wherein the crosslinker comprises at least one polymer having epoxide-reactive functional groups.

3. The coated article of claim 2 wherein the crosslinker contains active hydrogen groups.

4. The coated article of claim 1, wherein the epoxy resin is water reducible or water dispersible.

5. The coated article of claim 4, wherein the epoxy resin is water-dispersible.

6. The coated article of claim 1, wherein the crosslinker comprises an amine.

7. The coated article of claim 1, further comprising a latex topcoat layer.

8. The coated article of claim 1, wherein the water-based coating composition has a molar excess of epoxide groups to epoxide-reactive functional groups.

9. The coated article of claim 8, wherein the crosslinker comprises an amine and the water-based coating composition has a ratio of epoxide groups to amine groups greater than 1:1 and less than 6:1.

10. The coated article of claim 1, wherein the water-based coating composition further comprises an aqueous dispersion of polymer particles.

11. The coated article of claim 1, wherein the water-based coating composition further comprises an aqueous dispersion of polymer particles and a silicate salt.

12. The coated article of claim 11, wherein the silicate salt is potassium silicate, sodium silicate, lithium silicate, ammonium silicate or a combination thereof.

13. The coated article of claim 11, wherein the silicate salt is present in an amount of from about 2 to about 50% by weight of the water-based coating composition, based on the total weight of the non-volatile components.

14. The coated article of claim 1, wherein the water-based coating composition further comprises one or more olefinic compounds.

15. The coated article of claim 1, wherein one or both of the epoxy resin and the crosslinker are chemically blocked to delay onset of chemical reaction upon mixing; wherein a stimulus is used to de-block the epoxy resin or the crosslinker, allowing the crosslinker to react with and crosslink the epoxy resin.

16. The coated article of claim 15, wherein the crosslinker has blocked amine groups, yielding a ketimine.

17. The coated article of claim 15, wherein the stimulus is heat.

18. The coated article of claim 1, wherein the water-based coating composition is prepared by adding the epoxy resin directly to the latex polymer and mixing.

19. The coated article of claim 1, wherein the water-based coating composition is prepared by mixing a pre-emulsified epoxy resin with the latex polymer or by adding the epoxy resin to a latex monomer feed during latex polymer synthesis.

20. The coated article of claim 1, wherein the latex polymer is a multistage latex composition.

21. The coated article of claim 1, wherein the latex polymer is derived from acetoacetyl ethyl methacrylate.

22. The coated article of claim 1, wherein the latex polymer is derived from acetoacetyl ethyl methacrylate and comprises amine functional groups.

23. The coated article of claim 1, wherein the latex polymer comprises an epoxide-reactive functional polymer selected from epoxide reactive polyurethane, vinyl, polyamide, chlorinated polyolefin, acrylic, oil-modified polymer, polyester, or mixtures or copolymers thereof.

24. The coated article of claim 1, wherein the latex polymer comprises an acetoacetyl-functional polymer selected from acetoacetyl-functional polyurethane, epoxy, polyamide, chlorinated polyolefin, acrylic, oil-modified polymer, vinyl, polyester, or mixtures or copolymers thereof.

25. The coated article of claim 1, wherein the latex polymer has amine neutralized acid groups.

26. The coated article of claim 1, wherein the latex polymer is functionalized with olefinic groups or other crosslinkable groups that enable the latex polymer to participate in radiation curing.

27. The coated article of claim 1, wherein the coating is a dry film.

28. The coated article of claim 1, wherein the coating is cured.

29. A method, comprising the steps of:
providing a fiber cement composite substrate;
applying to the fiber cement composite substrate a water-based coating composition comprising:
an epoxy resin;
a crosslinker having epoxide-reactive functional groups;
a latex polymer, distinct from the epoxy resin; and
water;
wherein the crosslinker is provided in an amount sufficient to react with and crosslink the epoxy resin.

30. The method of claim 29, further comprising the step of allowing the water-based coating composition to harden.

31. The method of claim 29, further comprising applying a latex topcoat layer to the water-based coating composition.

32. The method of claim 31, wherein the latex topcoat layer is applied to the water-based coating composition while the water-based coating composition is in a liquid state.

33. The method of claim 31, wherein at least some water from the water-based coating composition is removed prior to applying the latex topcoat layer.

34. The method of claim 33, wherein a major portion of water from the water-based coating composition is removed prior to applying the latex topcoat layer.

35. The method of claim 31, further comprising the steps of:
   removing water from the water-based coating composition;
   curing the water-based coating composition; and
   applying the latex topcoat layer to the cured water-based coating composition;
   wherein the water-based coating composition has a molar excess of epoxide groups to epoxide-reactive functional groups, and wherein the excess epoxide groups react with active hydrogen groups in the latex topcoat layer.

36. The method of claim 29, wherein the water-based coating composition further comprises a silicate salt.

* * * * *